March 23, 1926.
G. E. MAIER
1,577,834
AIR BRAKE EQUIPMENT
Filed April 2, 1924    3 Sheets-Sheet 1
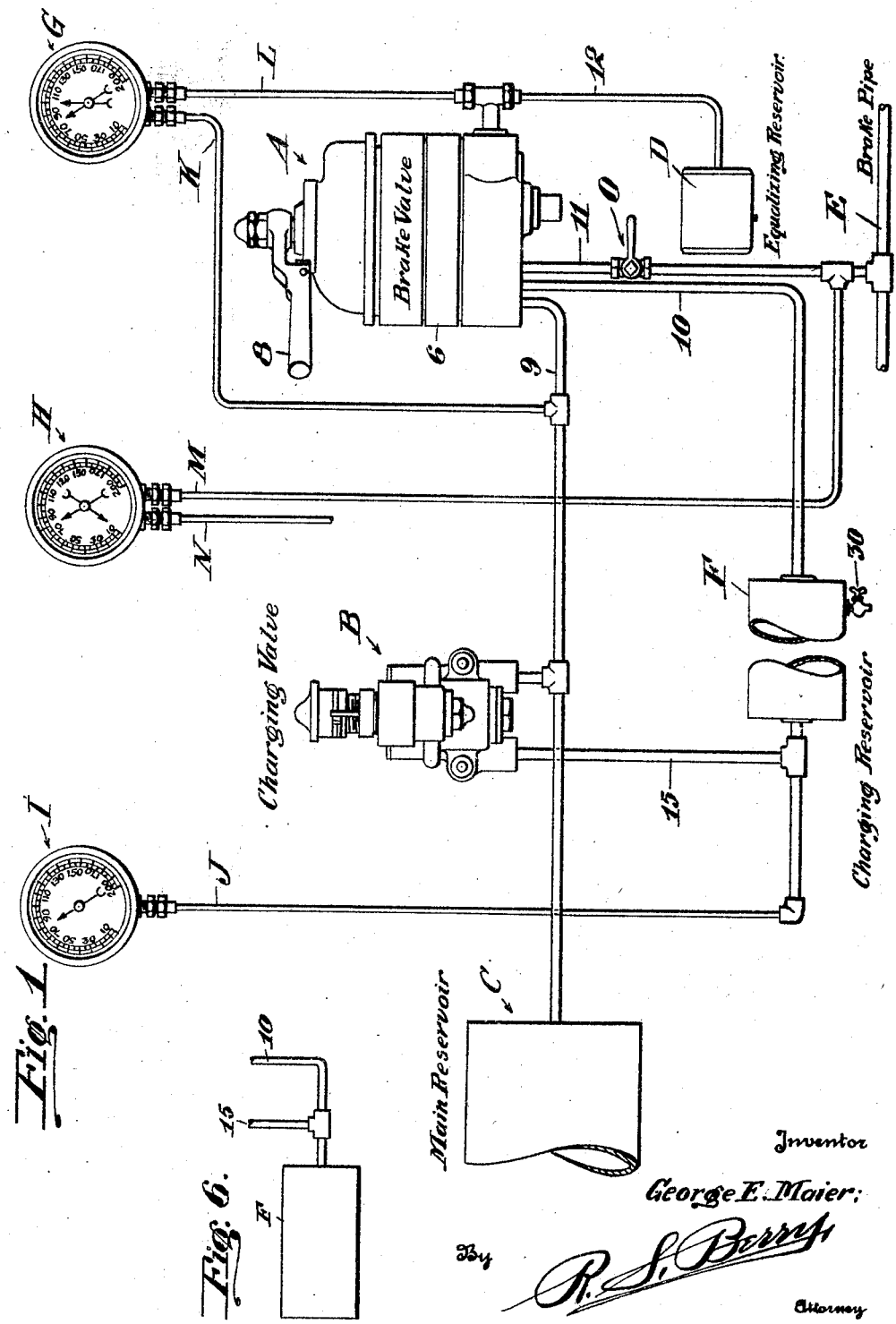

March 23, 1926. 1,577,834
G. E. MAIER
AIR BRAKE EQUIPMENT
Filed April 2, 1924     3 Sheets-Sheet 2
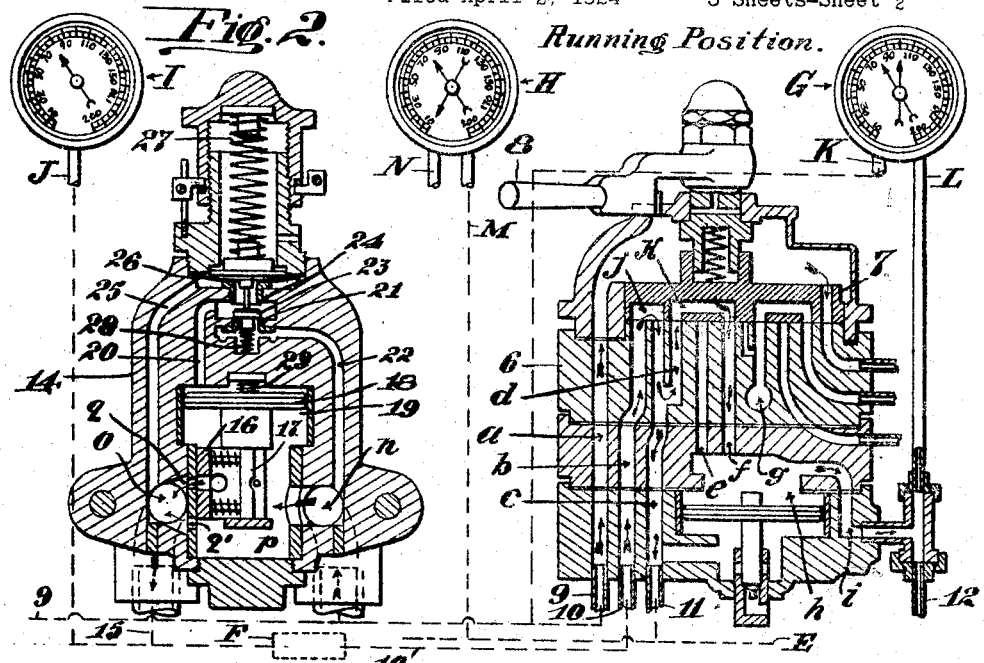
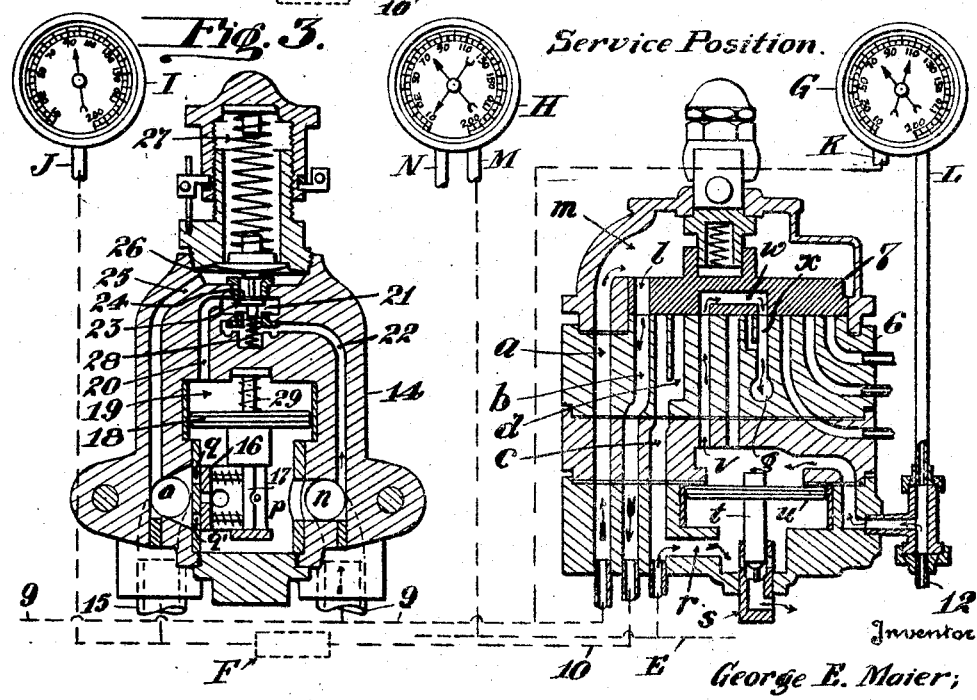
Inventor
George E. Maier;
By R. S. Berry
Attorney

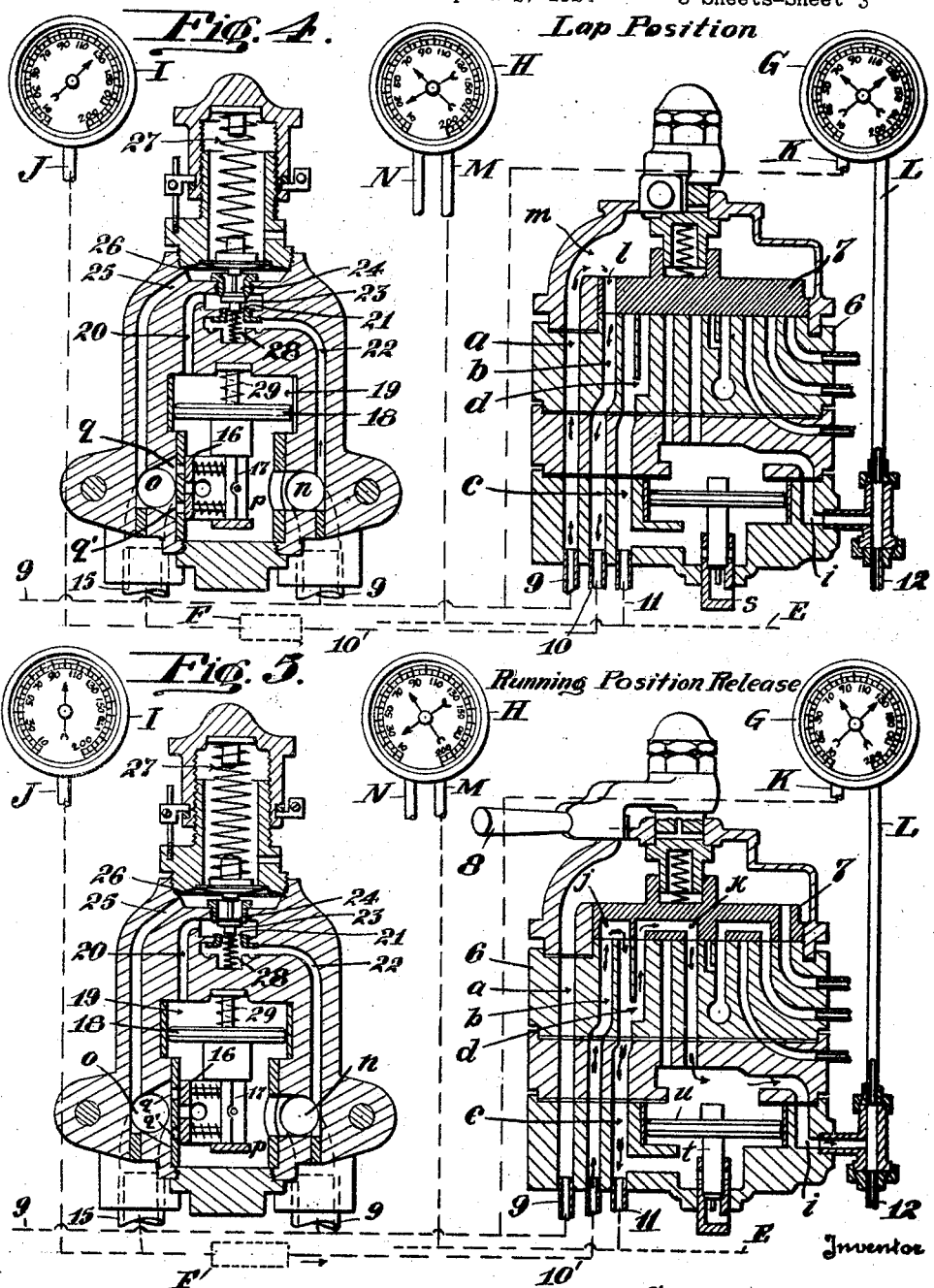

Patented Mar. 23, 1926.

1,577,834

UNITED STATES PATENT OFFICE.

GEORGE E. MAIER, OF LOS ANGELES, CALIFORNIA.

AIR-BRAKE EQUIPMENT.

Application filed April 2, 1924. Serial No. 703,726.

*To all whom it may concern:*

Be it known that I, GEORGE E. MAIER, a citizen of the United States, residing at Los Angeles, in the county of Los Angeles and State of California, have invented new and useful Improvements in Air-Brake Equipments, of which the following is a specification.

This invention relates to fluid pressure brake systems, and particularly pertains to the air brake equipment of locomotives.

An object of this invention is to provide a construction and arrangement in the brake control equipment of locomotives for facilitating the manipulation and control of the train brakes, and for insuring proper release of the brakes and re-charging of the brake system on operating the handle of the brake valve on the locomotive.

Another object is to provide an improved locomotive air brake equipment embodying means which will function to attain the following advantageous results:

First: To assist in maintaining the pressure in the brake pipe constant and normal when the brake valve is in the running position;

Second: To insure proper application of the brakes throughout the train on reduction of brake pipe pressure;

Third: To automatically and promptly replenish the brake pipe pressure and cause quick release of the brakes throughout the train, and uniformly effect recharge of the brake system on merely turning the brake valve to running position and thereby overcoming the possibility of overcharge and re-application incident to turning the brake valve to a release position and then to a running position, but, in event it should be desired to use a release position of the brake valve, to prevent the sudden drop and fluctuation of the brake pipe pressure when the brake valve is turned from release to running position;

Fourth: To assist in preventing precipitated moisture and foreign substances from passing to the brake pipe.

With the foregoing objects in view, together with such other objects and advantages as may subsequently appear, the invention resides in the parts, and in the combination, construction and arrangement of parts, or their equivalent, as hereinafter described and claimed and illustrated by way of example in the accompanying drawings, in which—

Figure 1 is a diagrammatic view illustrating a locomotive air brake equipment embodying the invention.

Figures 2, 3, 4 and 5 are diagrammatic views showing the brake valve and charging valve and their connections, and illustrating the parts thereof as disposed respectively in the running, service, lap, and running release positions.

Figure 6 (Sheet 1) is a detail illustrating a modified form of arrangement of the charging reservoir.

Referring to the drawings more specifically, A indicates a brake valve, B a charging valve, C a main reservoir, D an equalizing reservoir, and E a brake pipe, as are commonly employed in locomotive air brake equipment. The main reservoir C is designed to contain air under pressure supplied from any suitable source, such as the usual air compressor, not necessary to be here shown. In carrying out my invention I provide a supplemental reservoir F which for convenience will be hereinafter designated as a charging reservoir, for the reason that it cooperates with the charging valve as will be later described.

The brake valve A embodies a casing 6, rotary valve 7 within the casing, and a handle 8 connected to the valve for manually operating the latter; the casing being formed with passages $a$, $b$, and $c$ connecting with pipes 9, 10 and 11 communicating with the main reservoir C, charging reservoir F and brake pipe E, respectively. The casing 6 is also provided with passages $d$, $e$, $f$ and $g$; the passage $d$ communicating with passage $c$; passages $e$ and $f$ leading to a chamber $h$ having communication through a passage $i$ with a pipe 12 leading to the equalizing reservoir D; and passage $g$ opening to atmosphere or exhaust. The casing has other passages with which the present invention is not concerned. The valve 7 is formed with ports $j$ and $k$ (shown in Figures 2 and 5) and has a port $l$ (shown in Figures 3 and 4). When the valve 7 is in the running position shown in Figure 2, the port $j$ effects communication between the passages $b$ and $c$ connecting with the charging reservoir F and brake pipe E; and port K effects communication between passage $d$ opening to brake pipe and passage $f$ leading to chamber $h$ and to equalizing reservoir D through passage $i$.

When the valve is in "service" position, shown in Figure 3, the port $l$ affords communication between passages $a$ and $b$ through a chamber $m$ thereby opening communication between the main reservoir and the charging reservoir.

When the valve is in the lap position shown in Figure 4, the port $l$ affords communication between the main reservoir and the charging reservoir the same as when in service position.

When the valve is in the running release position shown in Figure 5, the ports $j$ and $k$ afford communication between the charging reservoir and brake pipe and between the brake pipe and the equalizing reservoir, the same as in the running position shown in Figure 2. The valve has other ports which are not necessary to be herein described.

The charging valve B is here shown as embodying a casing 14 which is formed with an inlet port $n$ and an outlet port $o$; the inlet port communicating with the main reservoir, through pipe 9, and the outlet port communicating with the charging reservoir through a pipe 15. The inlet port $n$ opens to a valve chamber $p$ in the casing 14 in which chamber is disposed a slide valve 16 adapted to open and close ports $q$—$q'$ to control communication between the inlet port $n$ and the outlet port $o$ and thereby make or break communication between the main reservoir and the charging reservoir and brake pipe.

The valve 16 normally closes the communication between the main reservoir and the charging reservoir when the brake pipe is fully charged, and operates to open communication between the main reservoir and the charging reservoir and the brake pipe on reduction of pressure in the brake pipe as will be later described. The slide valve 16 is engaged by a stem 17 fitted with a piston 18 arranged in a piston chamber 19, which chamber communicates beneath the piston with the chamber $p$ and carries main reservoir pressure below the piston. The upper portion of chamber 19 communicates with a passage 20 leading to a port 21 opening to passage 22 leading from the inlet $n$ and communicating with the main reservoir.

The port 21 is designed to be opened or closed, or partially closed, by a valve 23 which valve also is designed to open or close a port 24 forming a communication between the passage 20 and a passage 25 leading to the outlet $o$ and communicating with the charging reservoir. A spring pressed diaphragm 26 is arranged in the passage 25 and is designed, on reduction of pressure in the passage 25, by virtue of reduction of pressure in the charging reservoir and brake pipe, to operate under pressure of a spring 27 to move the valve 23 in opposition to a spring 28 or pressure in 22 and thereby open port 24 and close or nearly close port 21 so as to effect reduction of pressure in the chamber 19, above the piston 18, and thereby cause the excess pressure on the opposite side of the piston 18 to raise the piston and thereby open the ports $q$—$q'$, as shown in Figure 2, so that pressure from the main reservoir will pass to the charging reservoir. When the pressure in the charging reservoir has been restored to normal from the main reservoir, the diaphragm 26 will be retracted, thereby allowing valve 23 to close the port 24, and thereby fully open port 21 so as to equalize pressure on opposite sides of the piston 18, whereupon a spring 29 will operate on the latter and restore it to its normal position, as shown in Figures 3, 4 and 5, thereby moving the slide valve 16 to close the ports $q$—$q'$ thus shutting off communication between the main reservoir and the charging reservoir through the charging valve. The amount of pressure delivered to the charging reservoir from the main reservoir will be governed by the tension of the spring 27 bearing on the diaphragm in the charging valve, which tension may be adjusted and is normally to be the same as that of the normal pressure in the brake pipe.

In carrying out my invention I prefer to dispose the charging reservoir F as shown in Figure 1 of the drawings, namely, between the pipe 15 leading from the outlet side of the charging valve and the pipe 10 forming the communication between the charging reservoir and the passage $b$ in the brake valve; the pipe 15 opening to one end or side of the charging reservoir and the pipe 10 leading from the opposite end or side thereof, by which construction all of the air passing from the charging valve to the brake valve and thence to the brake pipe must pass through the charging reservoir. By this arrangement the charging reservoir will form a trap in which water of condensation and foreign substances may collect; the charging reservoir being provided with a normally closed drain cock 30, on opening of which the residue in the charging reservoir may be removed. This arrangement of the charging reservoir, however, is not essential to the operation of the invention any more than that it serves as a convenient and satisfactory means for assisting in the delivery of clean air to the brake pipe; it having been found in practice that the pipe 15 leading from the charging valve may connect directly with the pipe 10 between the brake valve A and the charging reservoir F as shown in Figure 6.

In the installation of my improved air brake equipment, pressure gages G, H, and I are provided; the gages G and H being the usual gages now generally employed in the ordinary locomotive air brake equipment, and the gage I being a gage which is provided for the purpose of indicating pressure at all times existing in the charging reservoir. This gage I is not necessarily essential in the operation of the invention, but is desirable inasmuch as it enables the operator to determine the amount of excess pressure existing in the charging reservoir at the time of beginning release of the brakes; and also shows at what pressure the charging valve is completing the recharging after the pressure in the charging reservoir is reduced below the adjustment of the charging valve, thereby enabling the operator to manipulate the brake valve more certainly, according to varying conditions, and also shows the normal pressure in the brake pipe when the brake system is fully charged. The gage I is connected to the charging reservoir through pipe J.

The gage G operates in the usual manner to denote pressures in the main reservoir and the equalizing reservoir, being connected thereto by pipes K and L, respectively.

The gage H operates in the usual manner to indicate pressures in the brake pipe and the brake cylinder, being connected thereto by pipes M and N, respectively.

The pipe 11 leading from the brake valve to the brake pipe is fitted with the usual cut-off cock O.

In the operation of the invention, when the brake valve is disposed in the running position as shown in Figure 2, with the system normally charged and the brakes released, the charging valve will operate at this time to take care of such leakage as may exist in the brake system after restoring the pressure in the brake pipe and brake system to normal; the parts of the charging valve being shown in Figure 2 in the charging position. This position prevails when the brake valve is in a running position during such time as there is a slight reduction of pressure in the brake pipe due to leakage and when the normal pressure is being restored, after which the charging valve will close. If there is leakage, such leakage will be constant and as a consequence there will be an alternate opening and closing of the charging valve if the leakage is slight, but, if the leakage is considerable the charging valve will open sufficiently to take care of such leakage while the brake valve is in running position. The charging valve will move to its open position on lowering of pressure in the brake pipe and charging reservoir as before described to permit air under pressure to pass from the main reservoir to the charging reservoir and brake pipe through the charging valve and brake valve; the air from the main reservoir flowing through the intake $n$ across chamber $p$ through ports $q$ and $q'$, through outlet $o$, pipe 15, charging reservoir F, pipe 10, passage $b$ in brake valve, port $j$ in valve 7 and passage $c$ to brake pipe E through pipe 11. When the pressure in the brake pipe is thus brought to normal, the charging valve will operate as before described to close the communication between the main reservoir and the charging reservoir. On this being done, the charging reservoir will contain air under pressure at the normal pressure carried in the brake pipe, being regulated by the adjustment of the tension of spring 27 in the charging valve, as before stated, and obviously, on any reduction or lessening of pressure in the charging reservoir and brake pipe, will cause reopening of the valve 16 in the charging valve.

In applying the brakes, the brake valve is operated by turning the valve 7 to the service position shown in Figure 3; whereupon a reduction of pressure in the brake pipe will be effected in the usual manner to apply the brakes; the air exhausting from the brake pipe to atmosphere through pipe 11 and through a passage $r$ in the brake valve, and thence to atmosphere through the usual exhaust fitting $s$ under the brake valve; the exhaust being opened in the usual manner, by a valve $t$ carried by a piston $u$ which is controlled in the usual manner by exhausting air from above the piston $u$ and from the equalizing reservoir D through a passage $v$ in the brake valve casing 6 and through a port $w$ in the valve 7, which then communicates to the atmosphere through a passage $x$. During this operation, communication between the charging reservoir and the brake pipe is cut off and communication is effected between the main reservoir and the charging reservoir by reason of the port $l$ in the valve 7 effecting communication between the passages $a$ and $b$ in the brake valve; air under pressure then flowing from the main reservoir through pipe 9, passage $a$, chamber $m$, port $l$, passage $b$, and pipe 10 to the charging reservoir, thus building up pressure in the charging reservoir to correspond to that in the main reservoir and which pressure is in excess of that which is normally delivered to the charging reservoir through the charging valve; it being understood that the main reservoir pressure is always in excess of the pressure carried in the brake pipe, as in common practice. Excess pressure is thus accumulated in the charging reservoir. No operation of the charging valve will occur at this time, it remaining closed, as the main reservoir pressure will then be in both the inlet and outlet and connecting passages of the charging valve.

As in common practice, after thus disposing the brake valve in the service position, the operator then turns the valve 7 of the brake valve to the lap position shown in Figure 4, when the pressure in the brake pipe is reduced slightly below that in the equalizing reservoir, which initially operates to close the exhaust from the equalizing reservoir through the passage $x$ so that pressure from the equalizing reservoir will then act on the piston $n$ to close the valve $t$, thus inhibiting further reduction of pressure in the brake pipe.

The port $l$ of the valve 7 in the brake valve will remain open to passage $b$ so as to maintain main reservoir pressure in the charging reservoir while the brake valve is in the lap position, the same as described in reference to the service position. However, the extent of excess pressure built up in the charging reservoir while the brake valve is in the service and lap positions, will depend on the length of time that such positions are maintained, or might be governed by the extent of opening of the port $l$ in valve 7 to passage $b$. The brakes will thus remain applied during the time the brake valve is in the service and lap positions.

To release the brakes in accordance with my invention, I dispose the brake valve in the running position as shown in Figure 5; although in some instances the release of the brakes may be effected in the usual manner by disposing the brake valve in what is known as the release position, not necessary to be here shown. By disposing the valve 7 of the brake valve in the running position, as shown in Figure 5, from either the service or the lap positions, which is done usually from the lap position, communication will be effected with the charging reservoir to the brake pipe through pipe 10 leading from the charging reservoir, passage $b$ in the brake valve, port $j$ in valve 7, passage $c$ in the brake valve, and pipe 11 leading to the brake pipe; at which time the charging reservoir will initially discharge its excess pressure to the brake pipe, thereby effecting a rapid increase of pressure in the brake pipe to cause quick release of the brakes. This release of the brakes is thus effected solely by the air pressure from the charging reservoir and not by air delivered from the main reservoir; as the communication between the main reservoir and the brake pipe is then cut off both at the charging valve and at the brake valve; therefore, the initial release of the brakes will be accomplished without any reduction of pressure in the main reservoir.

This discharge of excess pressure from the charging reservoir of course effects a reduction of pressure in the latter during the initial release of the brakes, and such reduction of pressure in the charging reservoir continues until the charging reservoir pressure is reduced to a pressure slightly below the adjustment of the charging valve, whereupon the charging valve will operate to open communication from the main reservoir to the brake pipe through the charging reservoir thereby delivering a volume of air from the main reservoir to the brake pipe through the charging valve and charging reservoir to replenish the brake system. Immediately upon the reduction of the pressure below that at which the charging valve is adjusted, the charging valve will begin to function as described relative to Figure 2 to effect the proper uniform recharge of the brake pipe or brake system.

It will now be seen that the release of the brakes and the recharging of the brake system is automatically accomplished merely by disposing the brake valve in the running position. The running position as here described is also a release position and may be termed such. This constitutes an important feature of the invention.

In event the brake valve is disposed in what is known as the release position (as with the ordinary equipment, in which the air directly flows from the main reservoir to the brake pipe) in effecting initial release, that is, from either the service or the lap position, the charging reservoir will perform no function, but on restoring the brake valve to running position from such release position then the charging reservoir will discharge its excess pressure air to the brake pipe as previously stated, at which time it will prevent sudden brake pipe fluctuation, and after which the charging reservoir reduces below the normal adjustment of the charging valve and operation continues as before described with respect to the running position.

By employing the charging reservoir F as herein set forth fluctuations or surges in the brake pipe pressure will be obviated during release of the brakes and recharging of the system, thereby preventing overcharge and reapplication of the brakes, and reducing the possibility of damage incident thereto.

In effecting these results, the charging reservoir functions as follows: On the initial discharge of the excess pressure from the charging reservoir to the brake pipe when making release, the reduction of pressure is so rapid as to produce an expansion which results in imparting velocity to the air entering the brake pipe, thereby setting up a pronounced increase in the brake pipe pressure without an appreciable increase in brake pipe volume. This increase in brake pipe pressure will be manifested throughout the length of the brake pipe, due to a resultant wave length which is governed by the pressure and volume of the charging reservoir, and which pressure and volume are predetermined, thereby insuring uniform release of the brakes throughout the train.

No serious fluctuations in the brake pipe will occur during recharge because the charging valve will cooperate with the charging reservoir and maintain the pressure of the charging reservoir considerably in excess of that of the brake pipe throughout the recharge period, and cause no interruption in the delivery of pressure from the main reservoir to the brake pipe through the charging valve and charging reservoir. During the recharge period the charging reservoir will lead the pressure in the brake pipe until the final point of recharge is made, at which time the charging reservoir and brake pipe will equalize.

While I have shown the invention as applied to the air brake equipment of a locomotive for the purpose of controlling the application and release of brakes on a train, it will be understood that the invention is also adapted to be employed in other uses where it is desired to regulate and control the delivery of fluid pressure from a source of fluid pressure supply to a point of discharge, particularly where it is desirable to maintain a substantially uniform main reservoir pressure irrespective of variations in the pressure discharge.

I claim—

1. In a device of the character described, the combination with a main reservoir, a brake valve, a charging valve, and a brake pipe, of a supplemental charging reservoir, said brake valve operable when in service and lap positions to open communication between the main reservoir and the charging reservoir, and when in the running release position to afford communication between the charging reservoir and the brake pipe, and said charging valve being automatically operable to normally close communication between the main reservoir and the charging reservoir when the brake pipe is fully charged to a predetermined pressure, and to automatically open communication between the main reservoir and the charging reservoir and the brake pipe, on reduction of pressure in the brake pipe.

2. In a device of the character described, a main reservoir, a charging reservoir, a brake pipe, a charging valve and a brake valve, said brake valve embodying a rotary valve for controlling passages communicating with the main reservoir, charging reservoir, and brake pipe, and operable when in the running position to effect communication between the charging reservoir and the brake pipe, and when in the service or lap positions to open communication between the main reservoir and the charging reservoir, said charging valve normally closing communication between the main reservoir and the charging reservoir when the brake pipe is fully charged and automatically operable to open communication between the main reservoir and the charging reservoir and the brake pipe, on reduction of pressure in the brake pipe.

3. In a device of the character described, the combination with a main reservoir, a brake valve, a charging valve, and a brake pipe, of a supplemental charging reservoir, said brake valve operable when in service and lap positions to open communication between the main reservoir and the charging reservoir, and when in the running release position to afford communication between the charging reservoir and the brake pipe, and said charging valve being automatically operable to normally close communication between the main reservoir and the charging reservoir when the brake pipe is fully charged, and to automatically open communication between the main reservoir and the charging reservoir and the brake pipe on reduction of pressure in the brake pipe, and adjustable means in said charging valve operable to automatically control the amount of pressure delivered to the charging reservoir from the main reservoir.

4. In a device of the character described, a main reservoir for containing fluid under pressure, a supplemental reservoir for containing fluid under pressure, a brake pipe, a brake valve for controlling the discharge of fluid pressure from the supplemental reservoir, said brake valve adapted to deliver fluid under pressure to the brake pipe from said supplemental reservoir in restoring pressure in the brake pipe to normal, and a charging valve operable to automatically control the delivery of fluid pressure from the main reservoir to the charging reservoir on reduction of pressure in the latter.

5. In a device of the character described, a main reservoir, a supplemental charging reservoir, a brake pipe, a brake valve having passages communicating with said main reservoir, charging reservoir and brake pipe, respectively, a valve member embodied in said brake valve adapted to be disposed in a service position, a lap position, and in a running position, said valve member being formed with ports adapted to effect communication when the valve member is in a running position between the charging reservoir and the brake pipe, and also having ports operable when the valve member is in service or lap position, or emergency, to open communication between the main reservoir and the charging reservoir, and an automatic charging valve having an inlet communicating with the main reservoir and an outlet communicating with the charging reservoir, and embodying means for making or breaking communication between said reservoirs operable to close the communication when the brake pipe is fully charged and to open the communication on reduction of pressure in the brake pipe.

6. In a device of the character described, a brake pipe, a charging reservoir, a main reservoir, a valve adapted to open and close communication between said charging reservoir and said brake pipe, and to open and close communication between said main reservoir and said charging reservoir operable when opening communication between the charging reservoir and the brake pipe to close communication between said main reservoir and charging reservoir through said valve, and to close communication between said charging reservoir and brake pipe on opening communication between the main reservoir and charging reservoir through said valve, and a charging valve controlling communication between said main reservoir and charging reservoir independent of said first named valve operable to automatically open communication between the main reservoir and the charging reservoir when the first named valve is disposed to open communication between the charging reservoir and the brake pipe, and also operable to close communication between the main reservoir and charging reservoir when the first named valve is positioned to effect communication between the main reservoir and charging reservoir.

7. In an air brake system embodying a brake pipe, a main reservoir containing fluid under pressure to be delivered to said brake pipe, a brake valve adapted to be operated to effect a reduction of pressure in the brake pipe, and means controlled by said brake valve operable in conjunction with said main reservoir to replenish the brake pipe pressure adapted to set up a pronounced increase in the brake pipe pressure without an appreciable increase in brake pipe volume.

8. The combination of a main reservoir for containing fluid under pressure and affording a reserve excess fluid pressure supply, a supplemental reservoir for containing fluid under pressure, a delivery pipe, valve controlled means for delivering fluid pressure from said supplemental reservoir to said pipe, and an automatic pressure controlled means operable on reduction of pressure in said supplemental reservoir to deliver fluid pressure from said main reservoir to said delivery pipe through said supplemental reservoir.

9. In an air brake system, a brake pipe, a main reservoir, a charging reservoir, a brake valve, means in said brake valve operable to deliver excess air pressure to said charging reservoir from said main reservoir, and means in said brake valve for effecting communication between said brake pipe and the charging reservoir and operable to effect initial replenishing of pressure in the brake pipe from the excess pressure in said charging reservoir without causing reduction of pressure in the main reservoir.

10. In an air brake system, a brake pipe, a main reservoir for supplying fluid pressure to the brake pipe, a communication between said main reservoir and said charging reservoir for delivering air under pressure from the main reservoir to the charging reservoir, a charging valve in said communication operable to automatically control the delivery of air under pressure from the main reservoir to the charging reservoir on reduction of pressure in the latter and operable to deliver to the charging reservoir a predetermined air pressure only less than that of the main reservoir, and a brake valve connecting said main reservoir and said charging reservoir to said brake pipe operable to afford communication between either the main reservoir or the charging reservoir with the brake pipe and also to afford direct communication between the main reservoir and the charging reservoir, whereby air pressure may be established in the charging reservoir equal to that of the main reservoir.

11. In a locomotive brake equipment, a brake pipe in an air brake system, a brake valve controlling the supply of fluid pressure to the brake pipe, a main reservoir adapted to be charged with fluid under pressure, a communication leading from said main reservoir to said brake valve, a charging valve interposed in said communication, and a supplemental reservoir in said communication located between said charging valve and said brake valve for affording an excess volume of fluid pressure and for assisting said charging valve in replenishing the pressure in the brake pipe and in maintaining brake pipe pressure at normal.

12. In a locomotive brake equipment, the combination with a primary reservoir adapted to be charged with fluid under pressure, a secondary reservoir, and a reducing valve device through which fluid under pressure is supplied at a reduced pressure from the primary reservoir to the secondary reservoir, of a brake pipe and a brake valve device having a release position in which fluid under pressure is supplied from the secondary reservoir to the brake pipe.

13. In a locomotive brake equipment, the combination with a reservoir charged with fluid at the pressure normally carried in the brake system, of a brake pipe and brake valve device having a release position in which fluid under pressure is supplied from said reservoir to the brake pipe.

14. The method of controlling the release of fluid pressure brakes which consists in supplying fluid to the brake valve device directly from a reservoir containing fluid at the pressure normally carried in the brake system, and in moving the brake valve handle to a position in which fluid is supplied from the reservoir to the brake pipe and then allowing the handle to remain in said position so long as the brakes are released.

GEORGE E. MAIER.